(12) United States Patent
Horigome et al.

(10) Patent No.: US 6,650,441 B1
(45) Date of Patent: Nov. 18, 2003

(54) SERIAL SCANNER APPARATUS, BI-DIRECTIONAL ERROR CORRECTION METHOD THEREFOR, AND STORAGE MEDIUM

(75) Inventors: Hideo Horigome, Yokohama (JP); Yukio Yuasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/412,741

(22) Filed: Oct. 4, 1999

(30) Foreign Application Priority Data

Oct. 6, 1998 (JP) .......................................... 10-297593

(51) Int. Cl.[7] ........................... H04N 1/024; H04N 1/04
(52) U.S. Cl. ...................... 358/474; 358/497; 358/472
(58) Field of Search ................................ 358/474, 497, 358/472

(56) References Cited

U.S. PATENT DOCUMENTS

| | | | |
|---|---|---|---|
| 6,144,778 A | * 11/2000 | Beauchamp et al. | 382/318 |
| 6,155,665 A | * 12/2000 | Lee | 347/19 |
| 6,236,471 B1 | * 5/2001 | Lee | 358/474 |
| 6,243,173 B1 | * 6/2001 | Lee et al. | 358/406 |
| 6,334,161 B1 | * 12/2001 | Suzuki et al. | 709/212 |

* cited by examiner

*Primary Examiner*—Edward Coles
*Assistant Examiner*—Houshang Safaipour
(74) *Attorney, Agent, or Firm*—Morgan & Finnegan, LLP

(57) ABSTRACT

A serial scanner apparatus, correction method thereof, and storage medium for performing bi-directional reading with high precision and greatly improving the reading speed. A carriage is first driven in the forward direction, then reversed, and driven in the backward direction. The carriage is accelerated until the speed reaches a predetermined velocity v1. When the predetermined velocity v1 is reached, the carriage is driven at constant speed. In the head portion of the constant-speed driving area, a correction area (reference correction area), having the same distance as that of the correction area for forward driving, is provided. With the use of an area (actual correction area) obtained by adding an area for correction time stored by a controller unit to the reference correction area, read-start timing is adjusted and the bi-directional error is corrected.

8 Claims, 19 Drawing Sheets

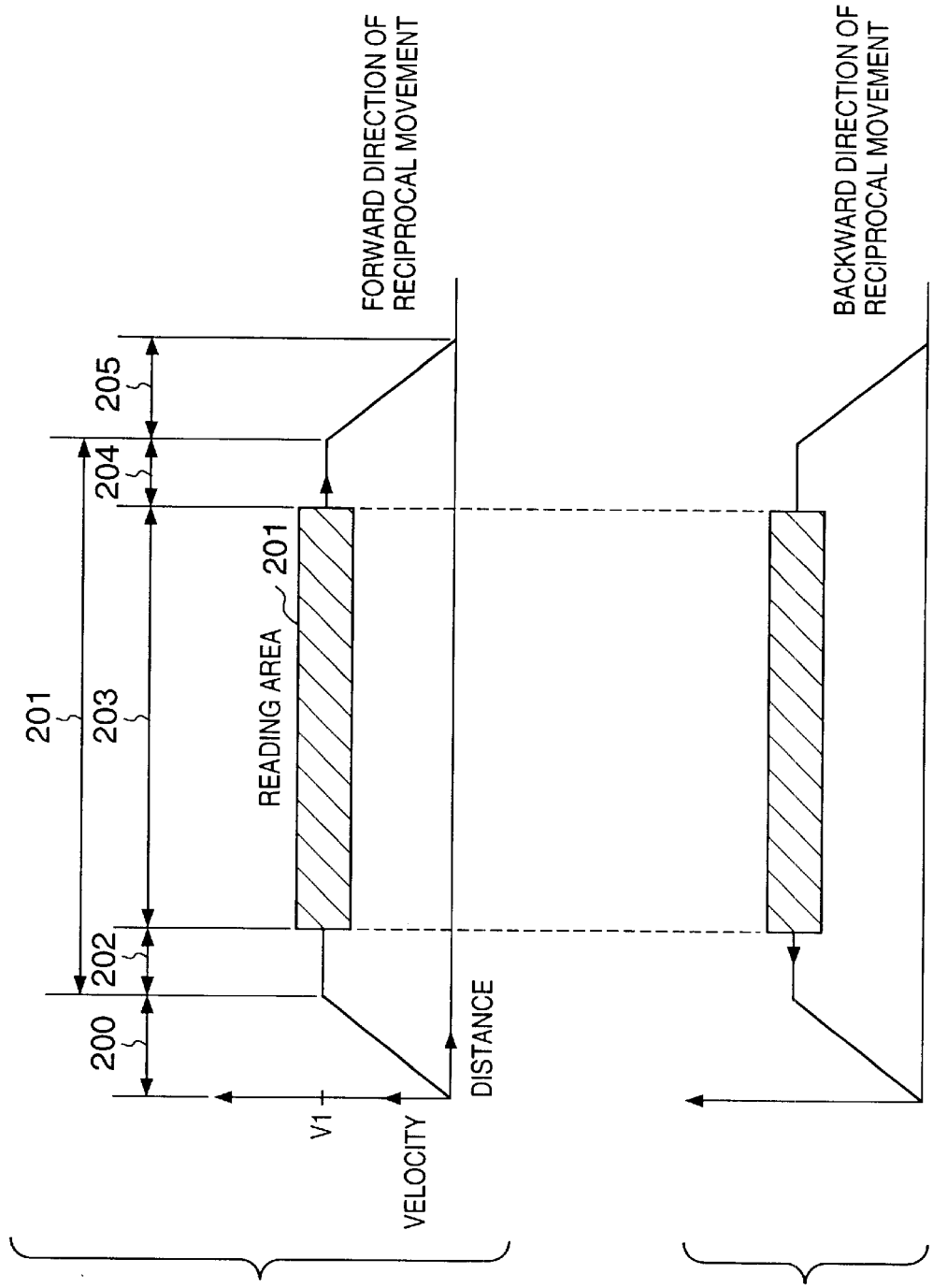

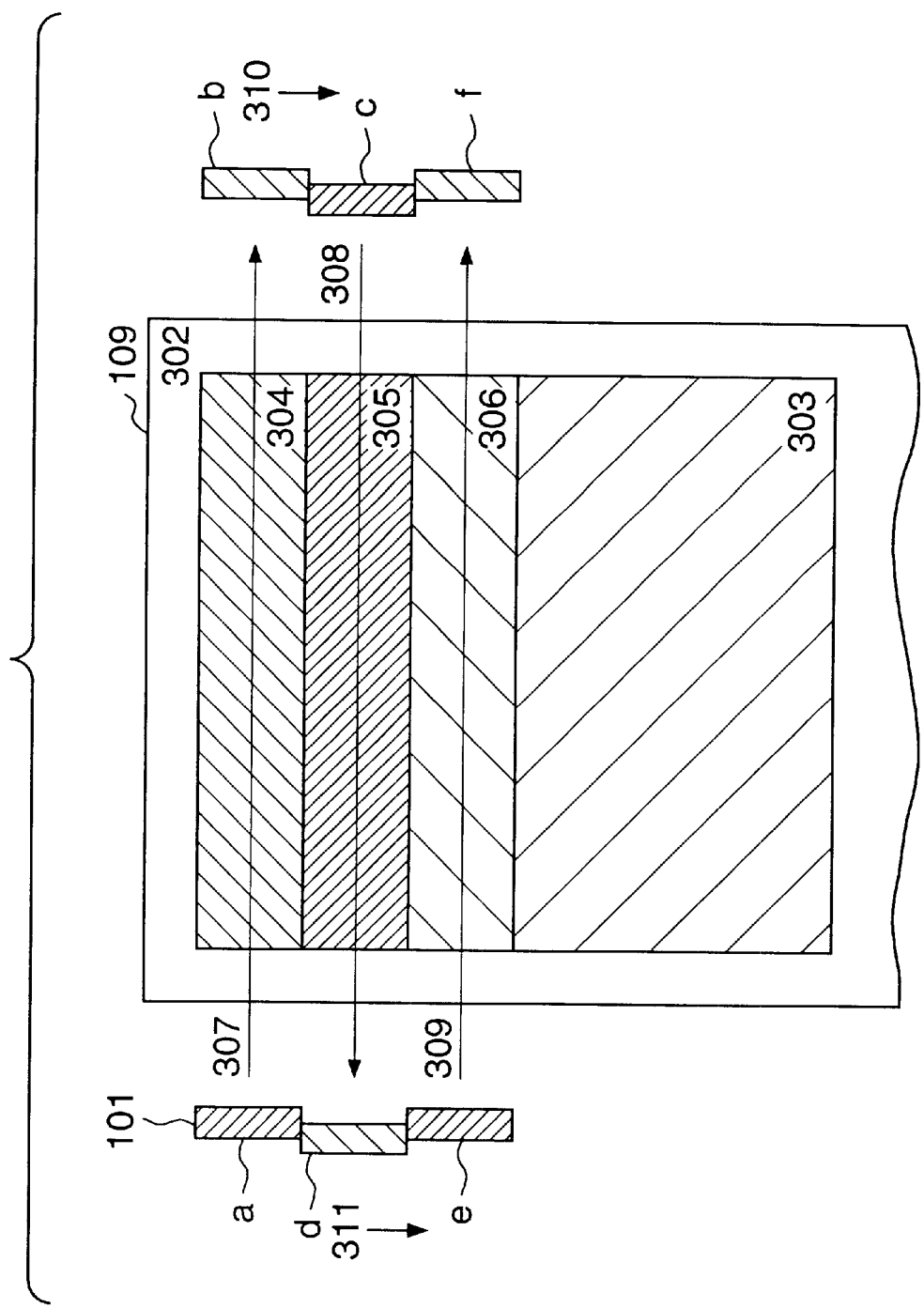

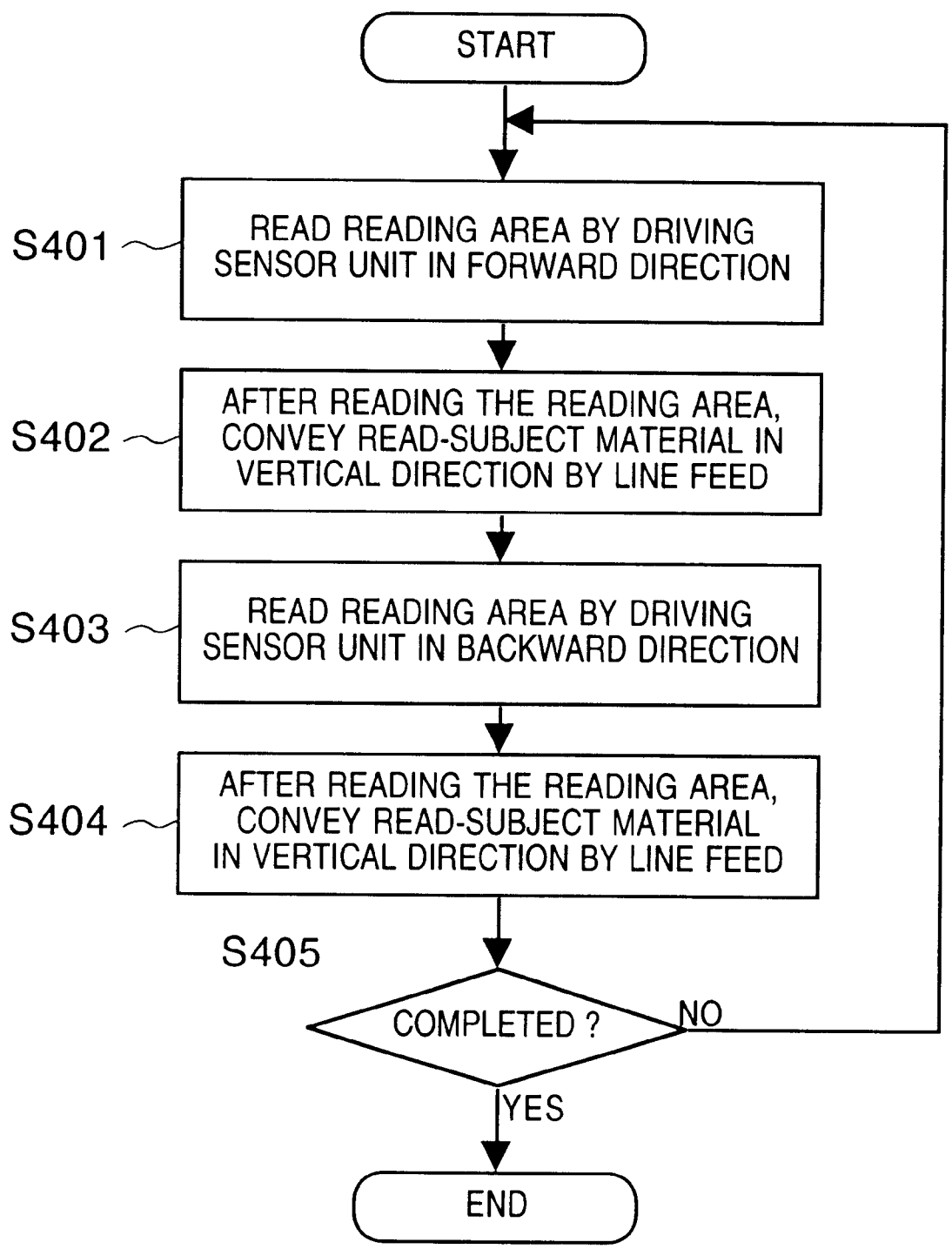

IMAGE BUFFER FOR FORWARD READING

IMAGE BUFFER FOR BACKWARD READING

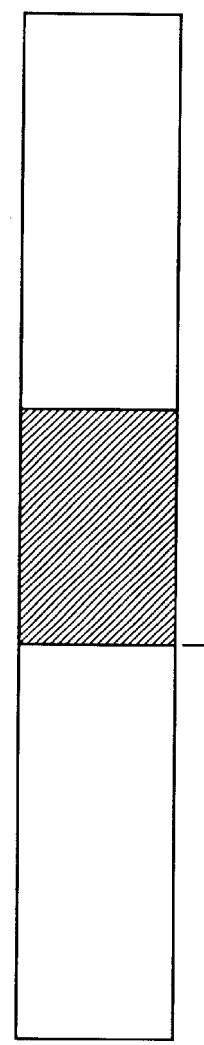
F I G. 9A
IMAGE BUFFER FOR
FORWARD READING
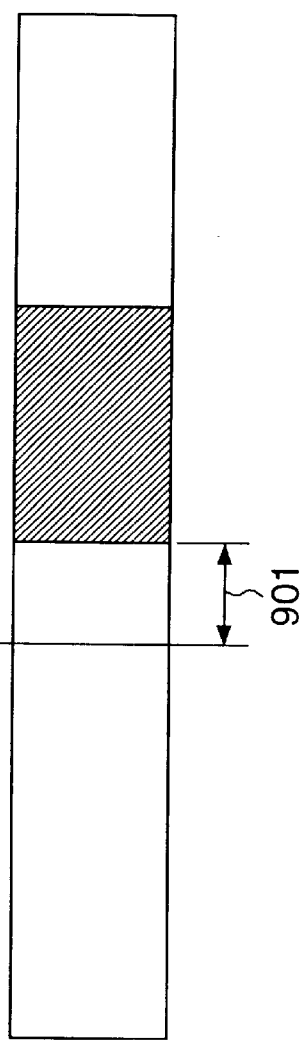
F I G. 9B
IMAGE BUFFER FOR
BACKWARD READING

FIG. 12
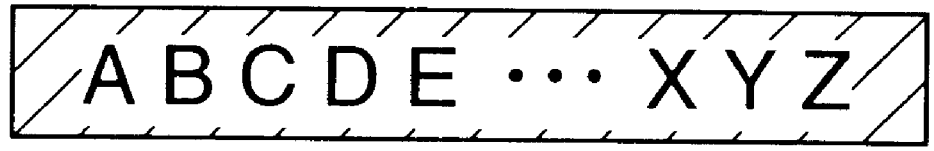

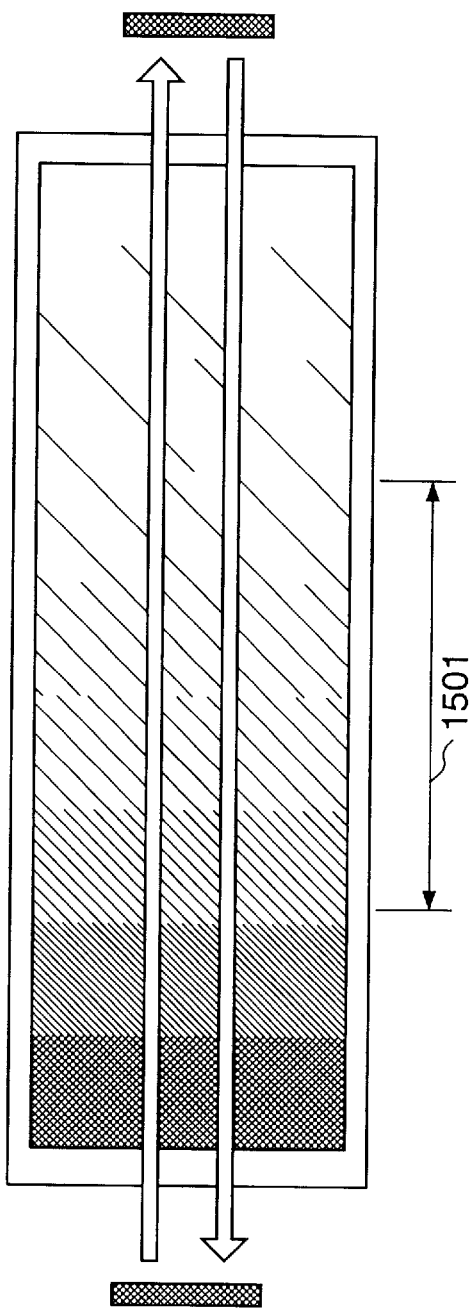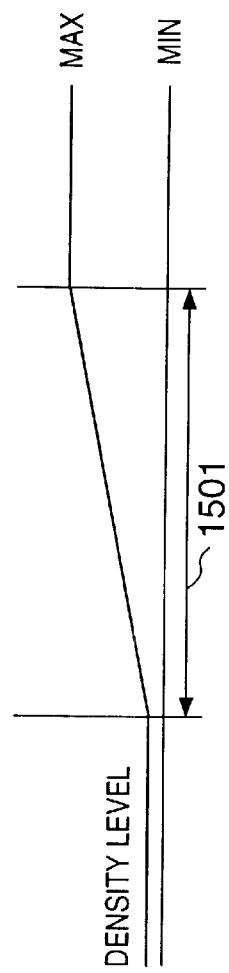
FIG. 15A
FIG. 15B

SERIAL SCANNER APPARATUS, BI-DIRECTIONAL ERROR CORRECTION METHOD THEREFOR, AND STORAGE MEDIUM

BACKGROUND OF THE INVENTION

The present invention relates to a serial scanner apparatus for reading an original document by reciprocally scanning a carriage having reading means, an error correction method for the serial scanner apparatus, and a storage medium.

According to a conventional scanner apparatus for reading an original document by reciprocally scanning a carriage having reading means, because of a play (mechanical tolerance) existing in a driving system of the carriage which causes the reading means to scan, a bi-directional deviation is generated when an image is obtained by reading the image bi-directionally. Since the bi-directional deviation varies due to unevenness in a manufacturing stage or varies depending on the apparatus, the deviation has conventionally been avoided by reading an image in one direction only.

However, although such technique enables avoiding bi-directional deviation, it only allows one-directional image reading, wasting time for a carriage return. Thus, image reading is time consuming.

In view of the above, another attempt has been made to read an image bi-directionally. More specifically, bi-directional deviation was measured for as many test machines as possible, and a statistical central value was obtained from distribution of the measured values. Then, by adjusting the read-start timing, influences of the varied deviation which depends upon the apparatus was minimized. However, because the correction value is not optimized for each apparatus, satisfactory effect could not be achieved.

In addition, switch means such as a DIP switch or the like may be used in order to make the read-start timing variable in plural stages. According to this technique, an actually read image is displayed on a display screen and deviation compensation can be adjusted for each apparatus while viewing the displayed image. However such technique is problematic because adjustment is time consuming, the technique lacks mass-producibility, and re-adjustment is required since the play in the carriage system varies over time.

SUMMARY OF THE INVENTION

The present invention is made in consideration of the above situation, and has as its object to provide a serial scanner apparatus, a correction method thereof, and a storage medium for performing highly precise bi-directional image reading and greatly improving the image reading speed.

In order to solve the aforementioned problems and achieve the object, the serial scanner apparatus according to the present invention is characterized by the following configuration.

More specifically, a serial scanner apparatus comprises: reading means, mounted on a carriage, for bi-directionally reading image data of a bi-directional error correction image by reciprocally moving the carriage in a predetermined area including the image; correction value calculation means for calculating an error correction value by comparing image data obtained during forward reading of said reading means with image data obtained during backward reading of said reading means; and correction means for correcting a bi-directional error by using the calculated error correction value.

Furthermore, a bi-directional error correction method of a serial scanner apparatus according to the present invention is characterized as follows.

More specifically, a bi-directional error correction method of a serial scanner apparatus comprises the steps of: bi-directionally reading, with reading means, image data of a bi-directional error correction image on a reading material by mounting the reading means on a carriage and reciprocally moving the carriage in a predetermined area including the reading material; calculating an error correction value by comparing image data obtained during forward reading with image data obtained during backward reading; and correcting a bi-directional error by using the calculated error correction value.

Furthermore, a storage medium according to the present invention is characterized by the following configuration.

More specifically, a storage medium storing a program in the form readable by a computer of a serial scanner apparatus, said program comprises the steps of: bi-directionally reading image data of a bi-directional error correction image by reading means mounted on a carriage by reciprocally moving the carriage, having the reading means, in a predetermined area including a reading material having the bi-directional error correction image; calculating an error correction value by comparing image data obtained during forward reading of the reading means with image data obtained during backward reading of the reading means; and correcting a bi-directional error by using the calculated error correction value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are explanatory views showing a relation between a reciprocal movement area of a carriage and an original document reading area;

FIG. 3 shows a scanning path of an image sensor unit with respect to an original document to be read;

FIG. 4 is a flowchart showing steps of bi-directional reading;

FIGS. 9A and 9B show an example of data read by reading operation and stored in an image buffer;

FIG. 12 shows image data stored in an image buffer;

FIGS. 15A and 15B show a half-tone image as an example of image pattern for bi-directional error detection, which is suitable to the third embodiment;

DETAILED DESCRIPTION OF THE PREFERRED EMBODIMENTS

Preferred embodiments of the present invention will be described in detail in accordance with the accompanying drawings.

<First Embodiment>

A first embodiment of the present invention is described with reference to FIGS. 1 to 10.

Figure 1:
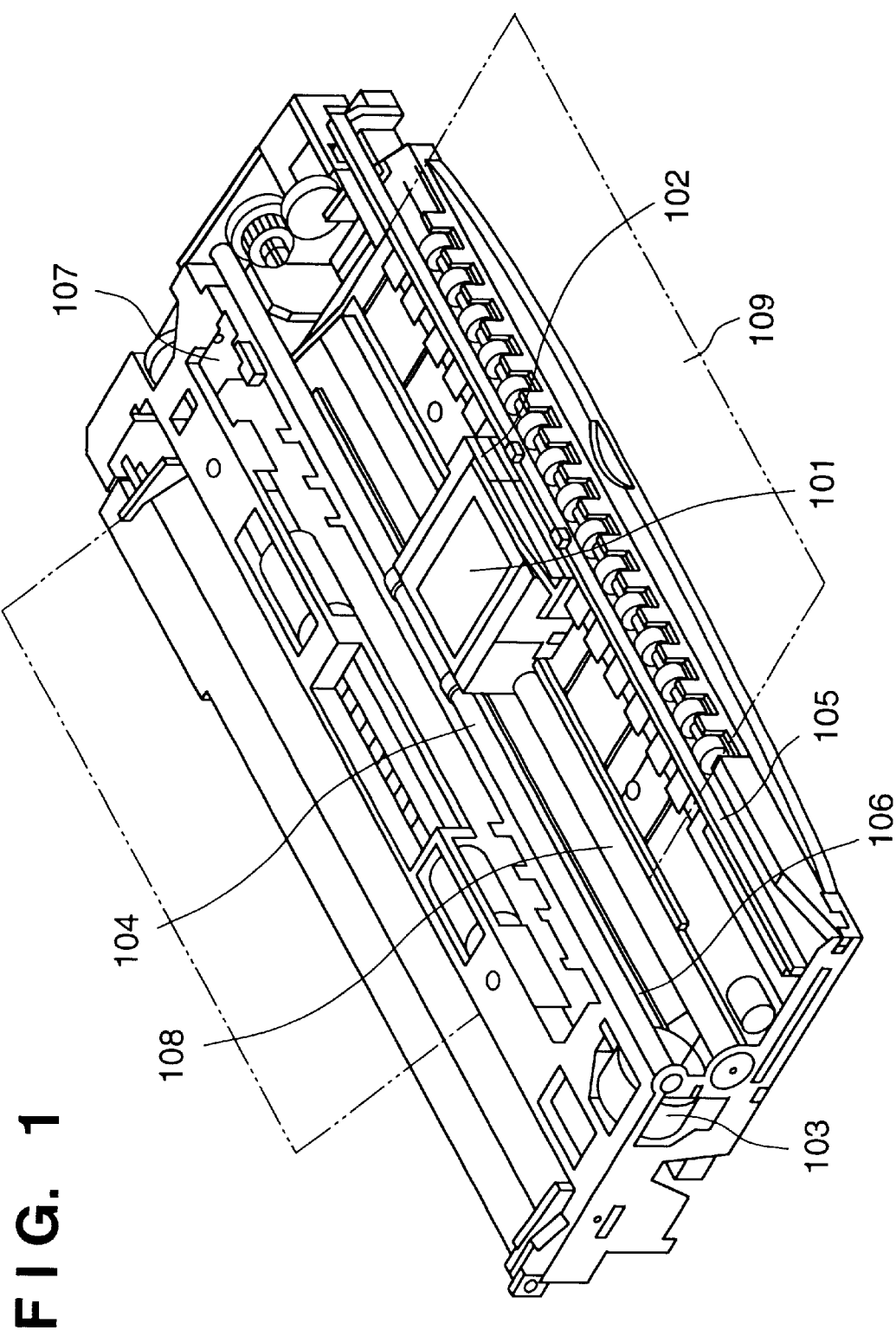
FIG. 1 is a perspective view showing an outer appearance of a serial scanner apparatus according to a first embodiment of the present invention.

FIG. 1 is a perspective view showing an outer appearance of a serial scanner apparatus according to the first embodiment. In FIG. 1, the serial scanner apparatus mainly comprises: an image sensor unit 101 for reading an original document; a carriage 102 to which the image sensor unit 101 is mounted; a carriage motor 103 for reciprocally moving the carriage 102; a guide axis 104; a guide rail 105; a driving belt 106 for transmitting driving force of the carriage motor 103 to the carriage 102; a feed roller 108 for conveying an original document 109, subjected to reading, in the direction perpendicular to the reciprocal movement of the carriage 102, while being pressed against the original document 109; and a paper feed motor 107 for driving a feed roller 108. The guide axis 104 and guide rail 105 are arranged in parallel, and straight reciprocal movement of the carriage 102 is realized by sliding the carriage 102 along the guide axis 104 and guide rail 105.

The operation of bi-directional reading in the above configuration is briefly described with reference to FIGS. 2 to 4.

FIGS. 2A and 2B are explanatory views showing the relation between a reciprocal movement area of the carriage 102 and an original document reading area.

The carriage 102 is accelerated in an area 200, from a stop position in the forward direction, until the moving speed of the carriage 102 reaches a predetermined velocity v1. When the predetermined velocity v1 is reached, the carriage 102 is moved through a predetermined area 201 at constant speed. Based on the lapse of time from the start of driving the carriage 102 (hereinafter referred to as driving lapse time), it is so determined that the image sensor unit 101 has reached the reading area 203. Then, image reading is started. The read image data is subjected to analog/digital conversion in the image sensor unit 101, and the converted data is sequentially transferred to a controller unit (not shown) of the serial scanner apparatus. In the controller unit, the transferred digital data is sequentially stored in an image buffer secured in the storage device such as RAM or the like. Furthermore, when it is determined that reading in the reading area 203 is completed based on the driving lapse time of the carriage 102, the image reading ends. Then in an area 205, the carriage 102 is decelerated and comes to a stop. Then, the original document is conveyed by the feed roller 108 for the height read by the image sensor unit 101.

FIG. 3 shows a scanning path of the image sensor unit 101 with respect to the original document 109 to be read. FIG. 4 is a flowchart showing steps of the above-described bi-directional reading.

First, the image sensor unit 101 is driven in the forward direction from the position a to the position b shown in FIG. 3 in the above-described manner, to read the reading area 304 of the original document (step S401). When reading of the reading area 304 is completed, the original document as a reading material is conveyed in the vertical direction by the feed roller 108. By this, the image sensor unit 101 is equivalently moved from the position b to the position c (step S402). The operation in steps S401 and S402 correspond to the operation shown in FIG. 2A.

Next, the image sensor unit 101 is driven in the backward direction from the position c to the position d to read the reading area 305 (step S403). When reading of the reading area 305 is completed, the original document, as the reading material, is conveyed in the vertical direction by the feed roller 108. By this, the image sensor unit 101 is equivalently moved from the position d to the position e (step S404). The operation in steps S403 and S404 correspond to the operation shown in FIG. 2B.

Then, it is determined whether or not reading for the entire area 303 of the original document has been completed (step S405). If reading has not been completed, steps S401 to S404 are repeated. If reading has been completed, the processing ends.

Figure 5A:
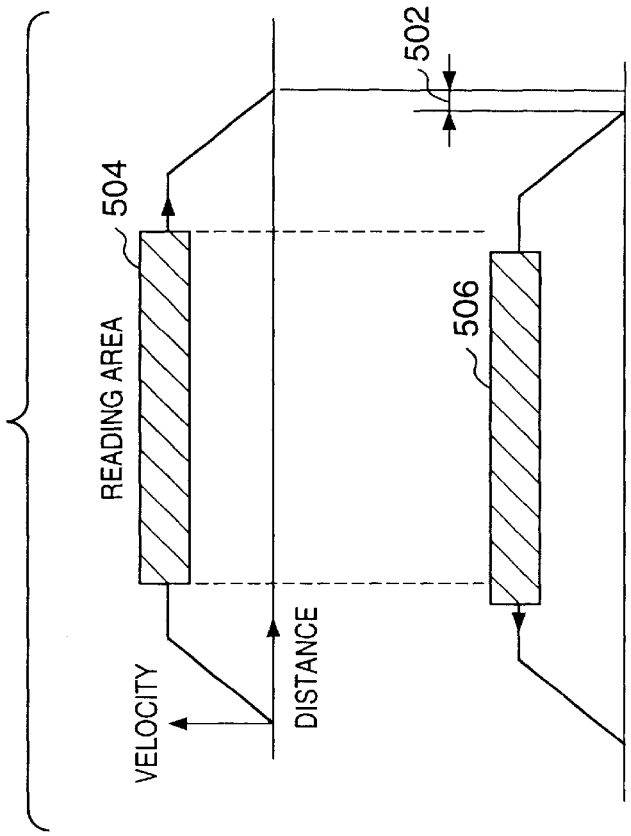
FIGS. 5A and 5B are explanatory views showing deviation of a moving distance generated during bi-directional reading and changes in a reading area caused by the deviation.
Figure 5B:
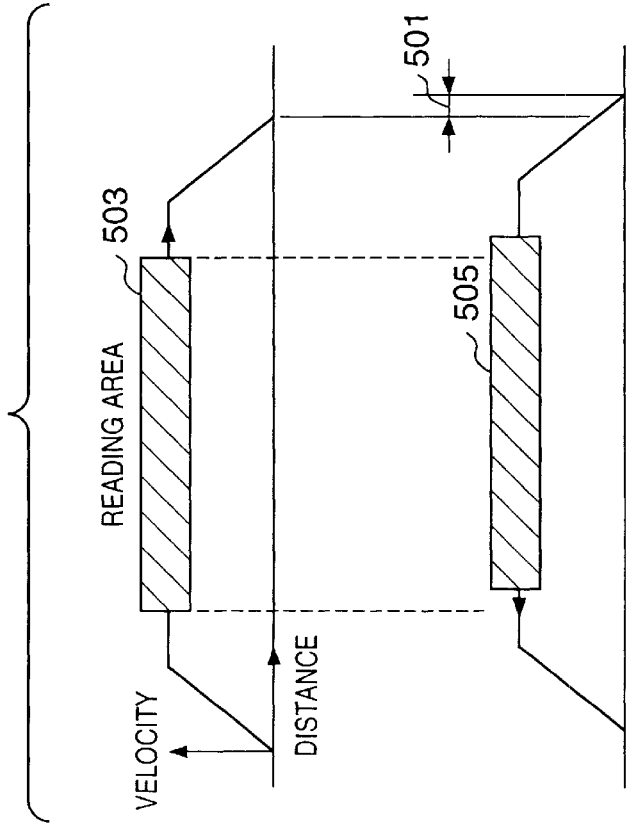

In the foregoing bi-directional reading operation, since the driving system of the carriage 102 has a play, despite the reading area set as indicated by reference numeral 503 in FIG. 5A or 504 in FIG. 5B, deviation 501 or 502 is generated in the moving distance when the carriage is reversed from forward movement to backward movement. As a result, hysteresis occurs between the reading areas 503 and 504 in the forward movement or the reading areas 505 and 506 in the backward movement. Note that FIGS. 5A and 5B are explanatory views showing deviation in a moving distance generated during bi-directional reading and the changes in the reading area caused by the deviation.

In order to prevent such hysteresis, the first embodiment employs a predetermined bi-directional detection image pattern for detecting deviation which causes generation of hysteresis, and correcting the error caused by the deviation.

Figure 6:
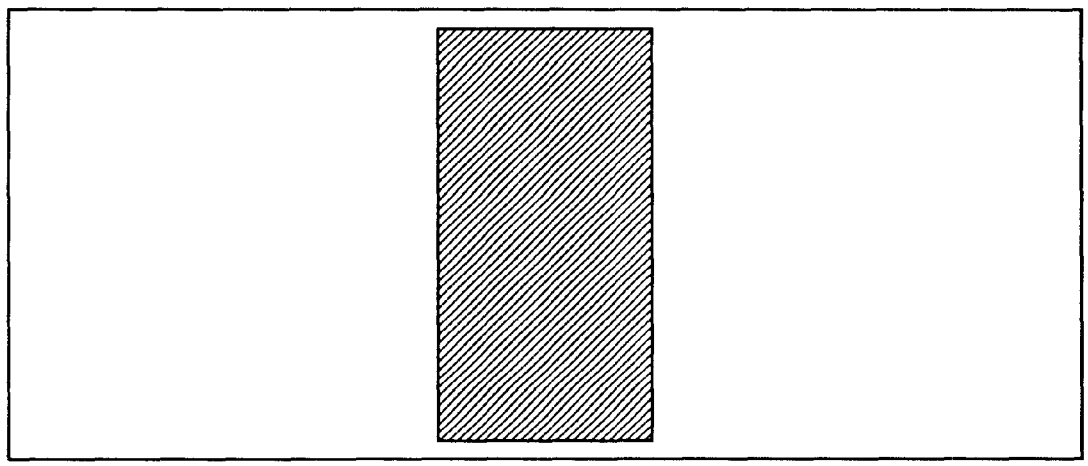
FIG. 6 is an explanatory view showing, as an example, an error detection image pattern.
Figure 7:
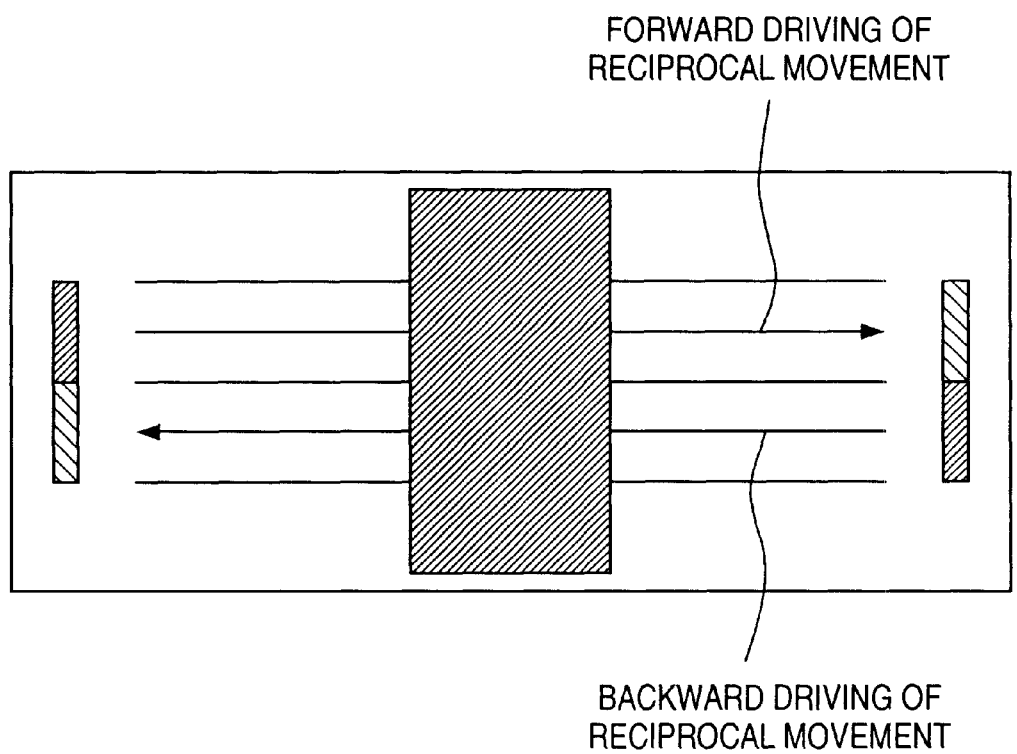
FIG. 7 is an explanatory view showing a reading area of the error detection image pattern shown in FIG. 6.
Figure 8A:
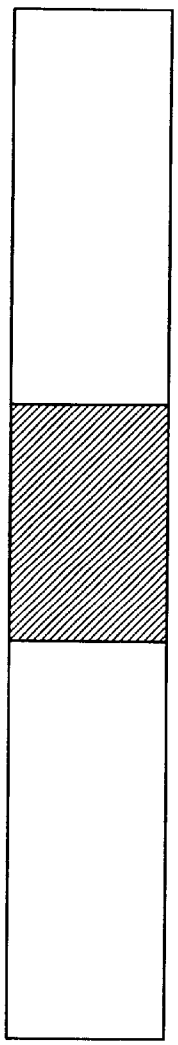
FIGS. 8A and 8B show an example of data read by reading operation and stored in an image buffer.
Figure 8B:
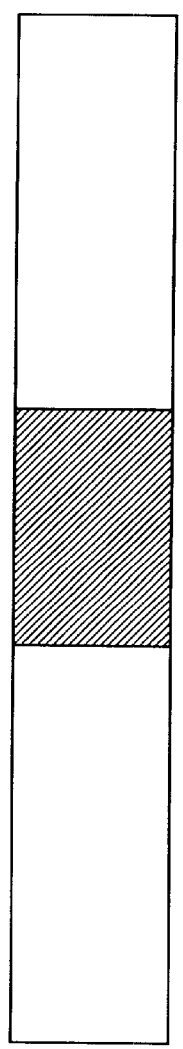

FIG. 6 is an explanatory view showing, as an example, an error detection image pattern. FIG. 7 is an explanatory view showing a reading area of the error detection image pattern shown in FIG. 6. FIGS. 8A, 8B, 9A and 9B show an example of data read by the reading operation shown in FIG. 7 and stored in an image buffer.

Note that the error detection image pattern may be provided within the apparatus, e.g., on a platen, or on a conveyance protection sheet which is provided for protecting an original document from being scratched or the like. Alternatively, the pattern may be independently provided as a dedicated sheet.

The image pattern shown in FIG. 6 is reciprocally read as shown in FIG. 7. The acceleration/deceleration constant of the carriage 102 in this stage is the same as the acceleration/deceleration constant for reading an original document. Suppose that the carriage driving system has an ideal construction with no play. In this case, the same contents should be obtained for the image data stored in an image buffer for forward reading storing image data obtained during forward reading and the image data stored in an image buffer for backward reading storing image data obtained during backward reading. However, because of the play in the driving system as mentioned above, bi-directional deviation 901 is generated as shown in FIG. 9. In view of this, according to the first embodiment, the number of columns in the bi-directional deviation width 901 is detected, then the number of columns is multiplied by time required for reading a column, i.e., multiplied by a driving cycle of the image sensor, thus calculating correction time corresponding to the amount of bi-directional deviation, and stored.

Figure 10A:
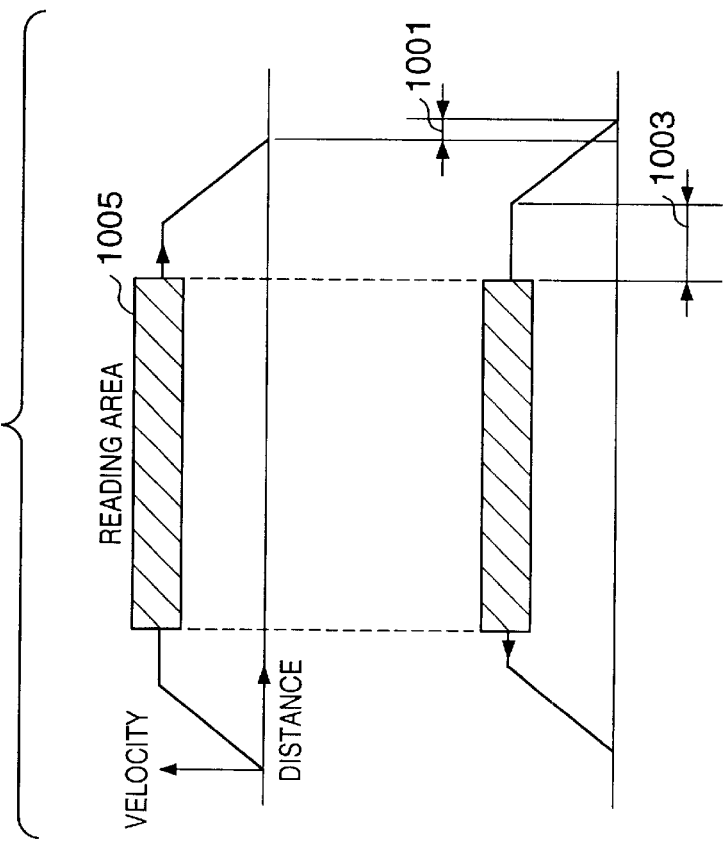
FIGS. 10A and 10B are explanatory views of bi-directional error correction when reading an original document.
Figure 10B:
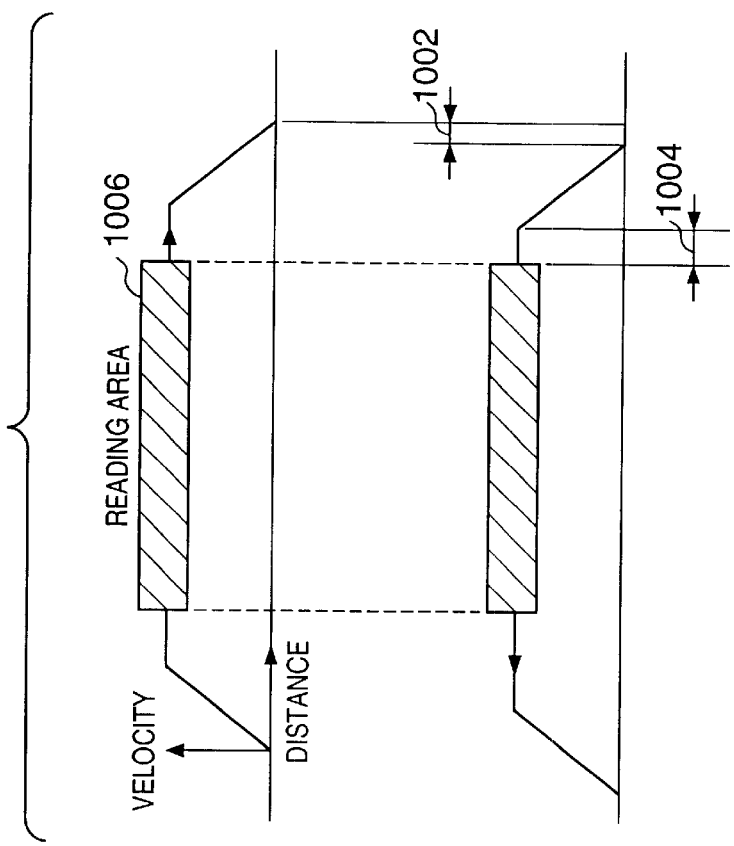

FIGS. 10A and 10B are explanatory views of bi-directional error correction when reading an original document, wherein FIG. 10A shows a correction method in a case where the image reading area in backward reading is deviated to the right while FIG. 10B shows a correction method in a case where the image reading area in backward reading is deviated to the left.

The carriage 102 is accelerated from a stop position in the forward direction until the moving speed of the carriage 102 reaches a predetermined velocity v1, and when the predetermined velocity v1 is reached, the carriage 102 is moved at constant speed. When it is determined that the image sensor unit 101 has reached the reading area based on the lapse of time from the start of driving the carriage 102, image reading is started.

After it is determined that reading of the reading area (1005 or 1006) has been completed based on the driving lapse time of the carriage 102, the driving of the image sensor is terminated. In order to secure a correction area, the carriage 102 is driven at constant speed for a predetermined period of time from the termination of the image sensor driving, then decelerated and stopped. In addition, the original document is conveyed by the feed roller 108 for the height read by the image sensor unit 101.

When the forward driving is completed, the carriage 102 is reversed to start driving in the backward direction. The carriage 102 is accelerated until it reaches a predetermined velocity v1, and when the predetermined velocity v1 is reached, the carriage 102 is driven at constant speed. In the head portion of the constant-speed driving area, a correction area (reference correction area) having the same distance as that of the correction area for the forward movement is provided. The read-start timing is adjusted to correct the bi-directional error by using an area 1003 or 1004 (actual correction area), obtained by adding (in the case of FIG. 10B, subtracting) an area for correction time (1001 or 1002) stored by the controller unit (not shown) to the reference correction area.

In the above-described manner, according to the first embodiment, even when performing bi-directional reading operation, hysteresis generated between the forward-reading area and backward-reading area is eliminated and highly precise bi-directional reading is possible.

Note that although the first embodiment is configured such that the error correction is performed at the beginning of the reverse driving as shown in FIG. 10, it goes without saying that the similar effects can be achieved by performing error correction during the forward driving.

Furthermore, in a case where there are a plurality of carriage driving velocity tables, a bi-directional error is detected in advance for each of the velocity tables and stored. By this, bi-directional error correction corresponding to each driving velocity table can be performed.

Further, for a case in which the play in the driving system of the carriage 102 changes over time, the first embodiment may be configured such that bi-directional error detection is performed at the time of turning on the power of the apparatus or before reading an original document. By this, even more precise bi-directional reading is possible.

As long as the function of the present invention is realized, a serial scanner apparatus may be a stand-alone apparatus or may be a part of a system constructed with a plurality of devices.

Further, the object of the present invention can also be achieved by providing a storage medium storing program codes for performing the aforesaid processes to a computer system or apparatus (e.g., a personal computer), reading the program codes, by a computer (CPU or MPU) of the system or apparatus, from the storage medium, then executing the program.

In this case, the program codes read from the storage medium realize the functions according to the present invention, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the first embodiment are realized by executing the program codes which are read by a computer, the present invention includes a case where an OS (operating system) or the like working on the computer performs a part or the entire processes in accordance with designations of the program codes and realizes functions according to the first embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the first embodiment.

<Second Embodiment>

Next, a second embodiment of the present invention is described with reference to FIGS. 11 to 13.

In the second embodiment, since the apparatus structure is the same as that of the first embodiment, description thereof will be omitted. Hereinafter, a bi-directional error correction method is described.

According to the second embodiment, instead of correcting the bi-directional error by adjusting reading timing as in the first embodiment, correction of the bi-directional error is performed on the image data stored in an image buffer at the time of reading an original image. Note that the steps of detecting a bi-directional error is the same as the first embodiment.

Figure 11:
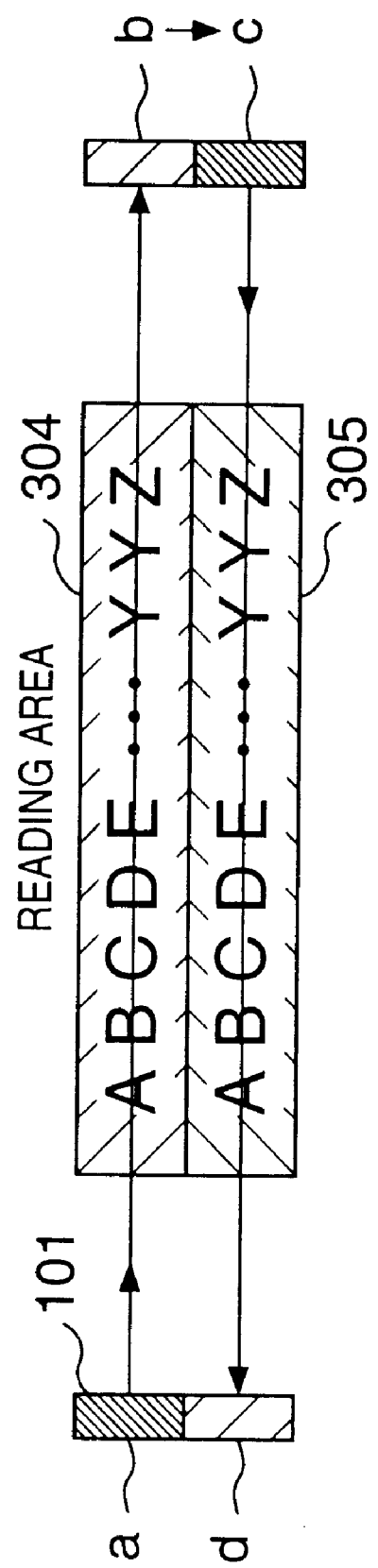
FIG. 11 is an explanatory view showing an original document to be read, which is used in bi-directional error correction of a serial scanner apparatus according to a second embodiment of the present invention.

FIG. 11 is an explanatory view showing an original document to be read. The image sensor unit 101 is driven in the forward direction from the position a to position b over the original document, and an image in the reading area 304 is read. The image data is stored in an image buffer for forward reading. When reading of the reading area is completed, the original document, as a reading material, is conveyed by the feed roller 108 in the vertical direction. By this, the image sensor unit 101 is equivalently moved from the position b to position c. By driving the image sensor unit 101 in the backward direction from the position c to position d, the reading area 305 is read from the original document. The image data obtained by the reading operation is stored in an image buffer for backward reading.

Figure 13A:
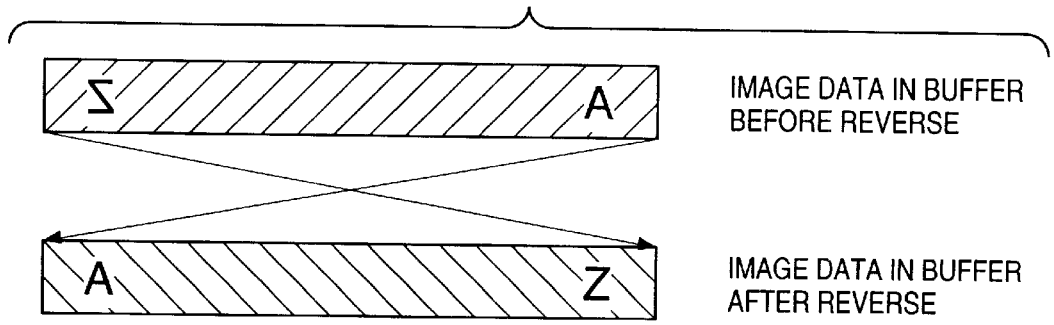
FIGS. 13A–13C is an explanatory view showing reverse processing steps of image data.
Figure 13B:
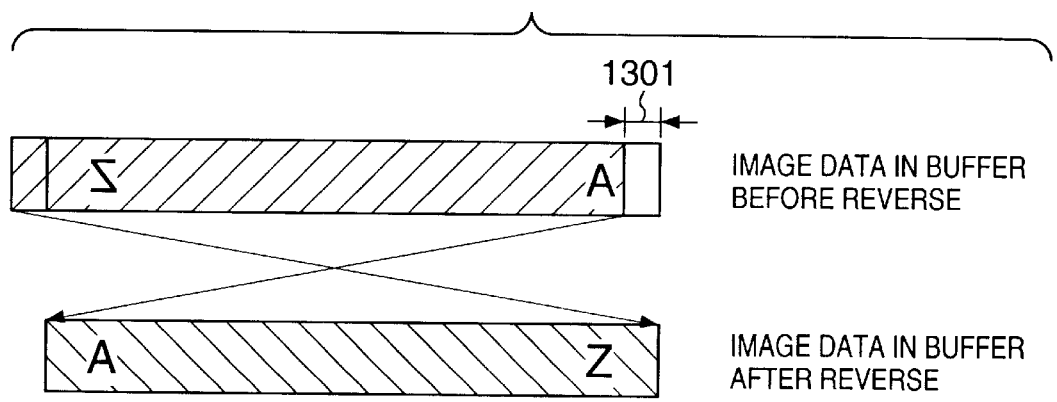
Figure 13C:
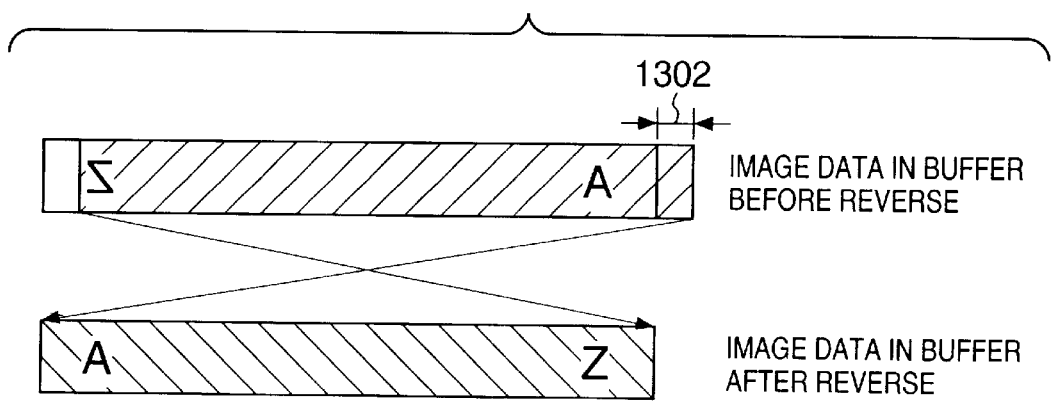

FIG. 12 shows image data stored in the image buffer as described above. As shown in FIG. 12, the image data obtained in the forward driving and backward driving are reversed. Therefore, as shown in FIGS. 13A to 13C, image data stored in the image buffer for backward driving needs to be reversed. FIGS. 13A to 13C are explanatory view of reverse processing of image data stored in an image buffer for reverse reading.

In the reverse reading, the read-start position is shifted to the right or left for the number of columns corresponding to the bi-directional error detected by the above-described technique described in the first embodiment. By this, the bi-directional error can be corrected. More specifically, according to the example shown in FIGS. 13A to 13C, image data reversal is started from the position shifted for the number of columns corresponding to the bi-directional error from the image data obtained in backward driving, i.e., image data reversal is started from the position shifted to the right for the width 1301 as shown in FIG. 13B or the position shifted to the left for the width 1302 as shown in FIG. 13C.

As described above, according to the second embodiment, since bi-directional error correction is performed on the image data stored in an image buffer at the time of reading an original image, the bi-directional error can be corrected with the image buffer control only.

<Third Embodiment>

Next, a third embodiment of the present invention is described with reference to FIGS. 14 to 17. In the above-described first and second embodiments, correction is performed while one column of data in an image buffer is considered as the minimum unit. However, in the third embodiment, correction resolution is increased to improve the precision of bi-directional image reading.

Figure 14:
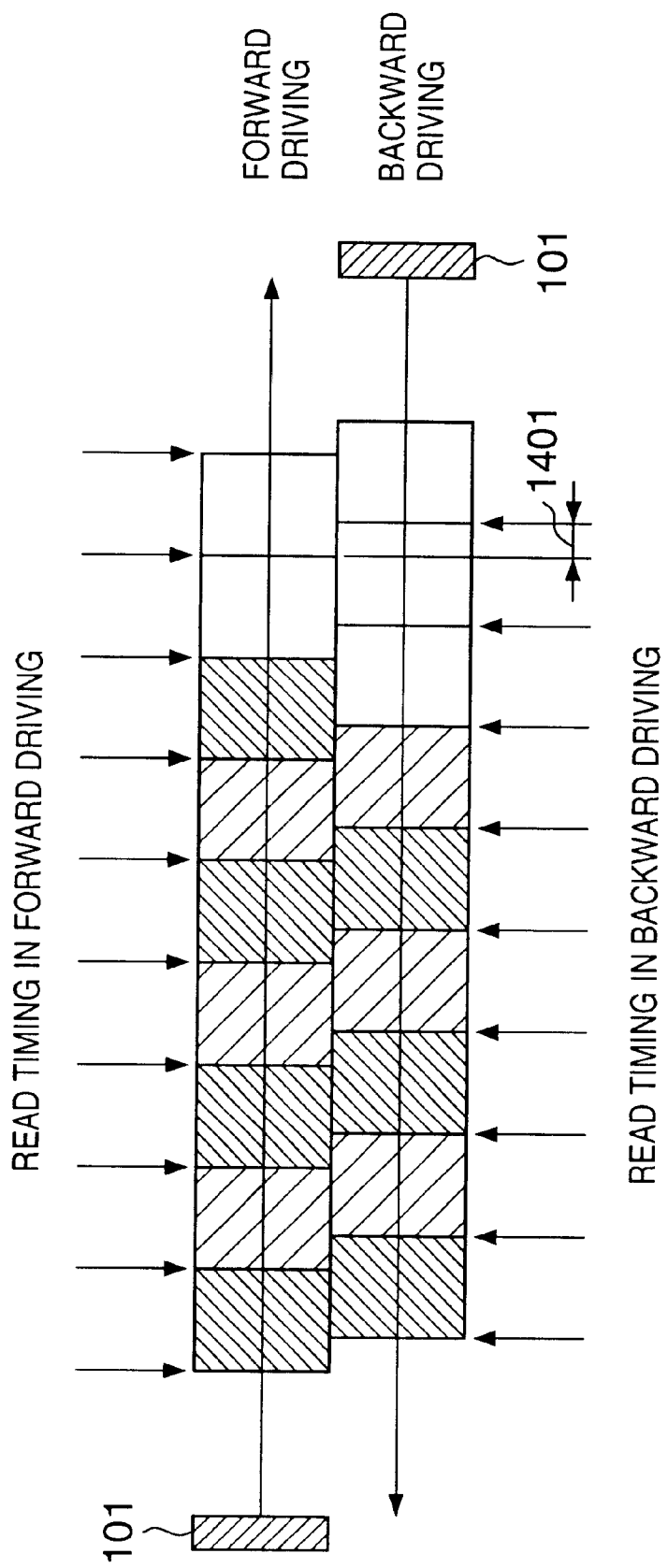
FIG. 14 is an explanatory view showing a driving (reading) timing of an image sensor when performing forward driving and backward driving in a serial scanner apparatus according to a third embodiment of the present invention.

FIG. 14 is an explanatory view showing a driving (read) timing of an image sensor during forward driving and backward driving. As shown in FIG. 14, the image sensor is driven in constant cycles in unit of columns. Therefore, if the timing of the driving cycle perfectly matches between the forward reading and backward reading, in other words, if the read timing in forward driving perfectly matches with the read timing in backward driving, image data having higher quality can be obtained.

In view of this, in order to detect a bi-directional error (portion indicated by numeral 1401 in FIG. 14) in the driving cycle, an image pattern for error detection, whose density linearly changes as shown in FIG. 15A, is prepared. FIG. 15A shows an example of image pattern for bi-directional error detection, which is suitable to the third embodiment, and FIG. 15B shows density variation of the image pattern shown in FIG. 15A. The image sensor unit 101 bi-directionally reads the image pattern and stores density in the image buffer as multi-valued data.

Figure 16:
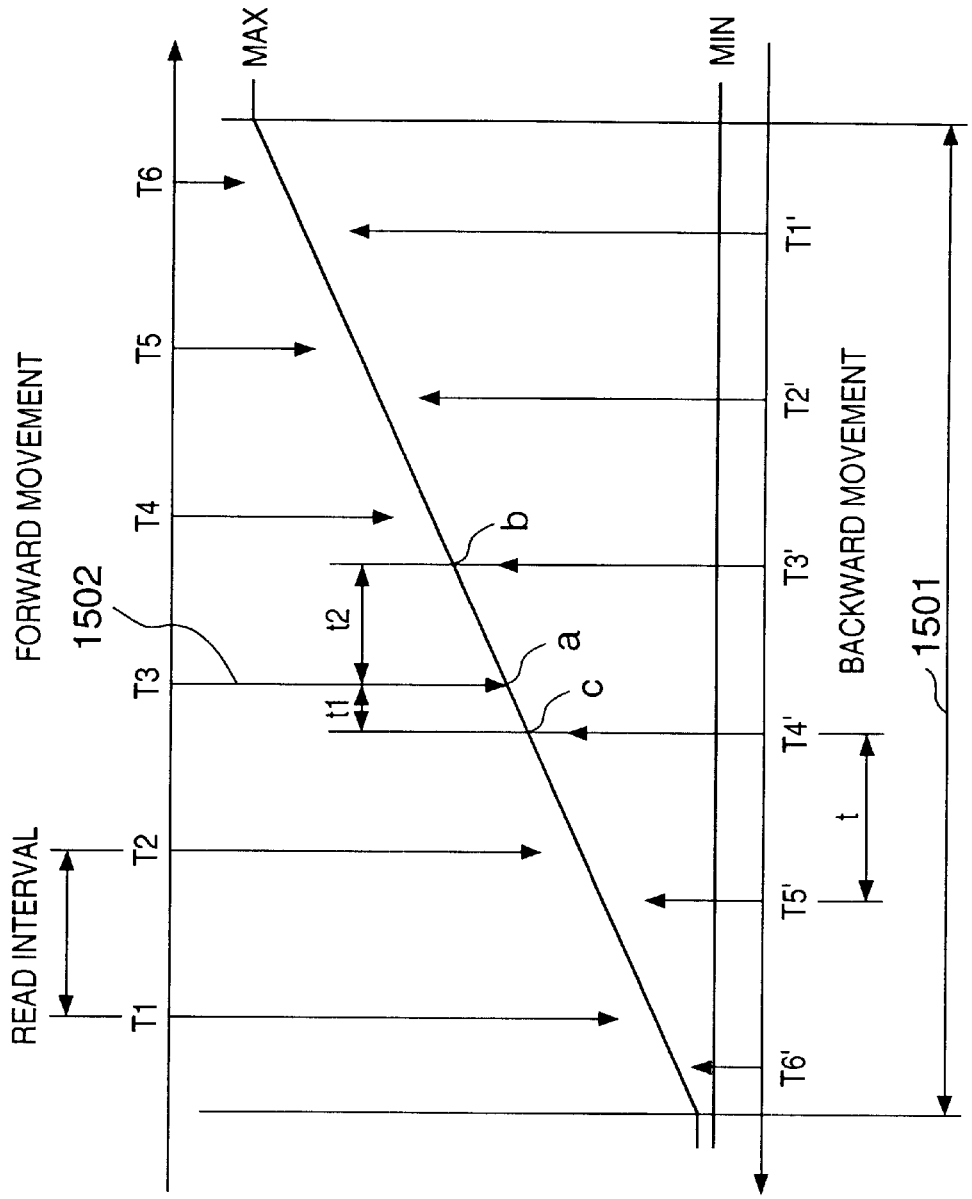
FIG. 16 is a view for explaining bi-directional error detection steps in detail.

FIG. 16 is a view for explaining the bi-directional error detection steps in detail. As shown in FIG. 16, first, the image pattern is read at timing T1 to T6 in the forward driving. Image data read at the timing corresponding to an arbitrary point of an area 1501, where density changes, is stored in the image buffer for forward reading. In the example shown in FIG. 16, image data a read at the timing T3 is stored in the image buffer for forward reading.

Next, the image pattern is read at timing T1' to T6' in the backward driving, and the read image data is stored in the image buffer for backward reading. By referring to the image data a stored in the image buffer for forward reading, data closest to the image data a is searched for in the image data stored in the image buffer for backward reading. In the example shown in FIG. 16, image data b read at timing T3' or image data c read at timing T4' is extracted.

Since density of the image pattern linearly changes in the area 1501, a bi-directional error can be calculated based on a density difference between the image data a and b, or density difference between image data a and c. A bi-directional error t2 can be calculated by equation (1), using the density difference between the image data a and b:

$$t2 = \{(b-a)t\}/(b-c) \tag{1}$$

A bi-directional error t1 can be calculated by equation (2), using the density difference between the image data a and c:

$$t1 = \{(a-c)t\}/(b-c) \tag{2}$$

Figure 17B:
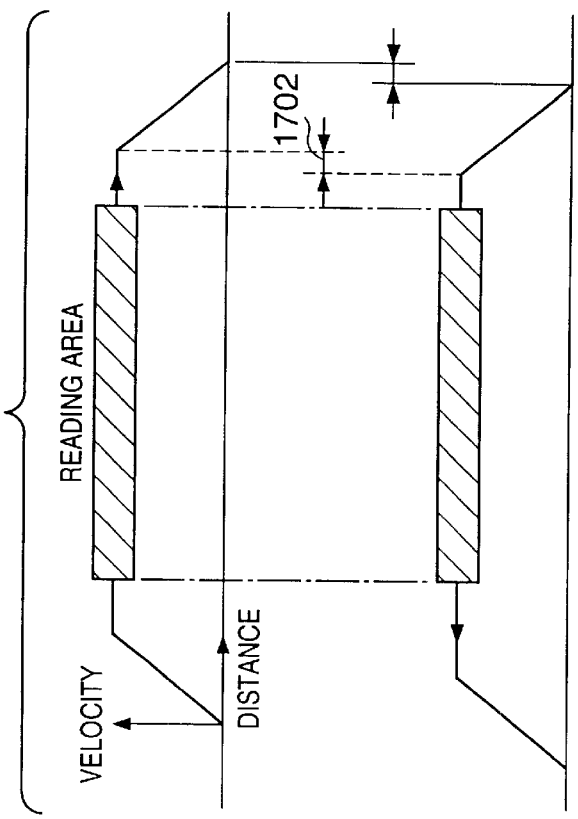
FIGS. 17A and 17B are explanatory views of read-start-timing adjustment steps using a calculated bi-directional error.
Figure 17A:
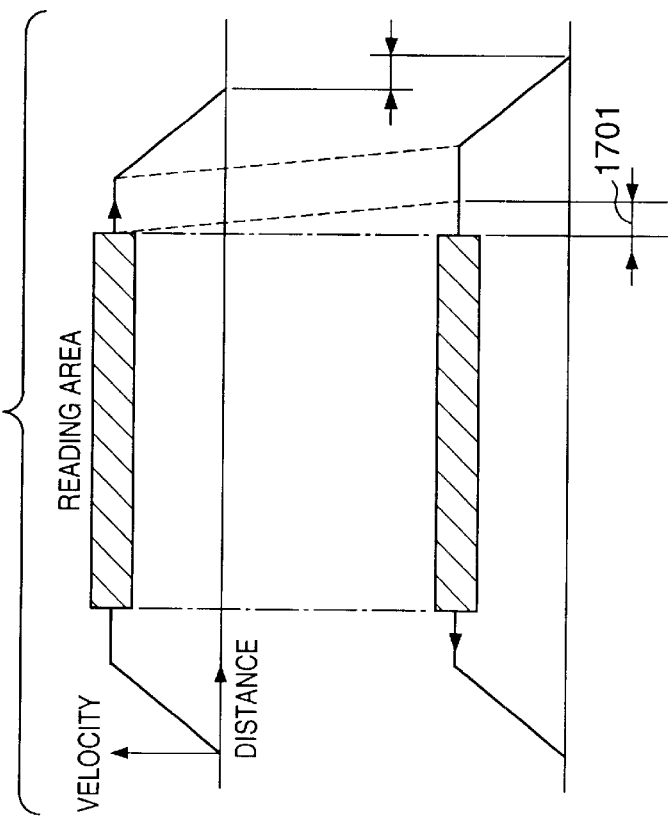

The calculated bi-directional error is used to calculate the correction time. Similar to the steps described in the first embodiment, the read-start timing in the reference correction area at the time of backward driving is adjusted for the calculated correction time. FIGS. 17A and 17B are views for explaining steps of adjusting the read-start timing using the calculated bi-directional error described above. More specifically, as shown in FIG. 17A, if the reading area at the time of backward driving is deviated to the right, reading is started at the timing delayed by the time period corresponding to the bi-directional error 1701. Meanwhile as shown in FIG. 17B, if the reading area at the time of backward driving is deviated to the left, reading is started earlier for the time period corresponding to the bi-directional error 1702.

As described above, according to the third embodiment, with the use of the reading material for detecting of a bi-directional error, whose density linearly changes, it is possible to detect a bi-directional error in a driving cycle which is shorter than the column unit. Therefore, compared to the first and second embodiments, more precise bi-directional reading is possible.

<Fourth Embodiment>

Next, a fourth embodiment of the present invention is described with reference to FIGS. 18 and 19.

Figure 18:
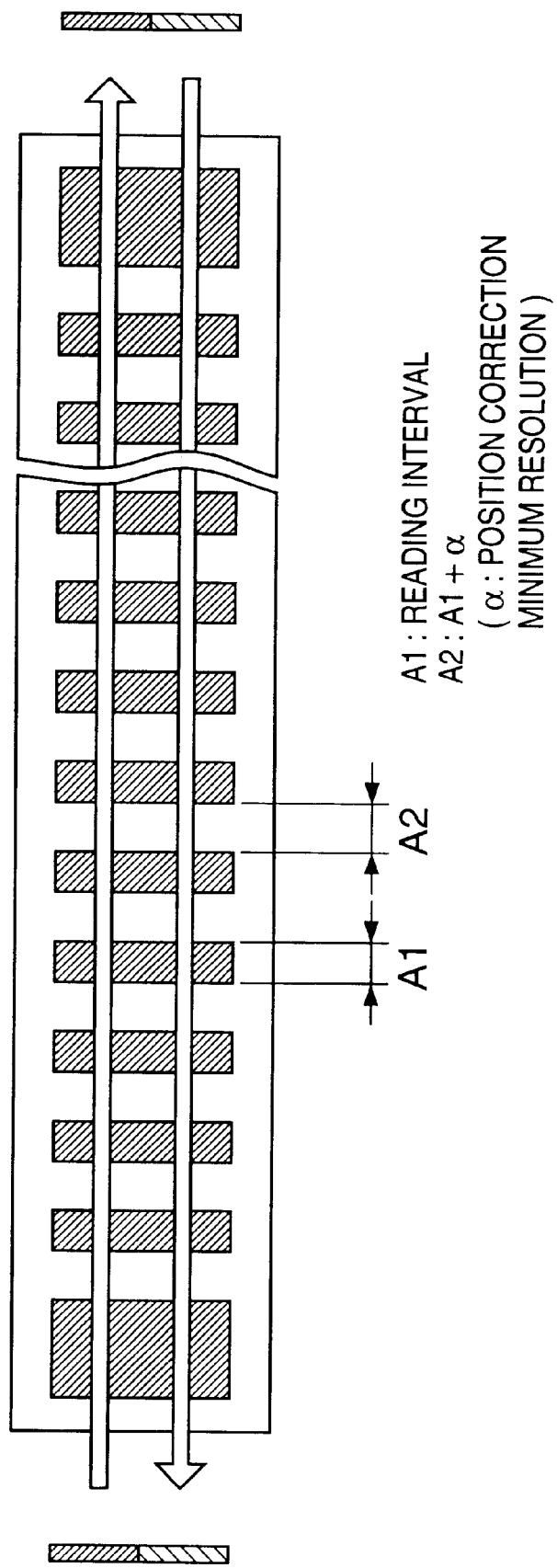
FIG. 18 shows an example of image pattern for bi-directional error detection, which is suitable to bi-directional error detection of a serial scanner apparatus according to a fourth embodiment of the present invention.

FIG. 18 shows an example of an image pattern for bi-directional error detection, which is suitable to the fourth embodiment. In FIG. 18, width A1 corresponds to a reading interval of the image sensor, and width A2 is the width in which the minimum position-correctable unit a is added to the reading interval A1.

Figure 19:
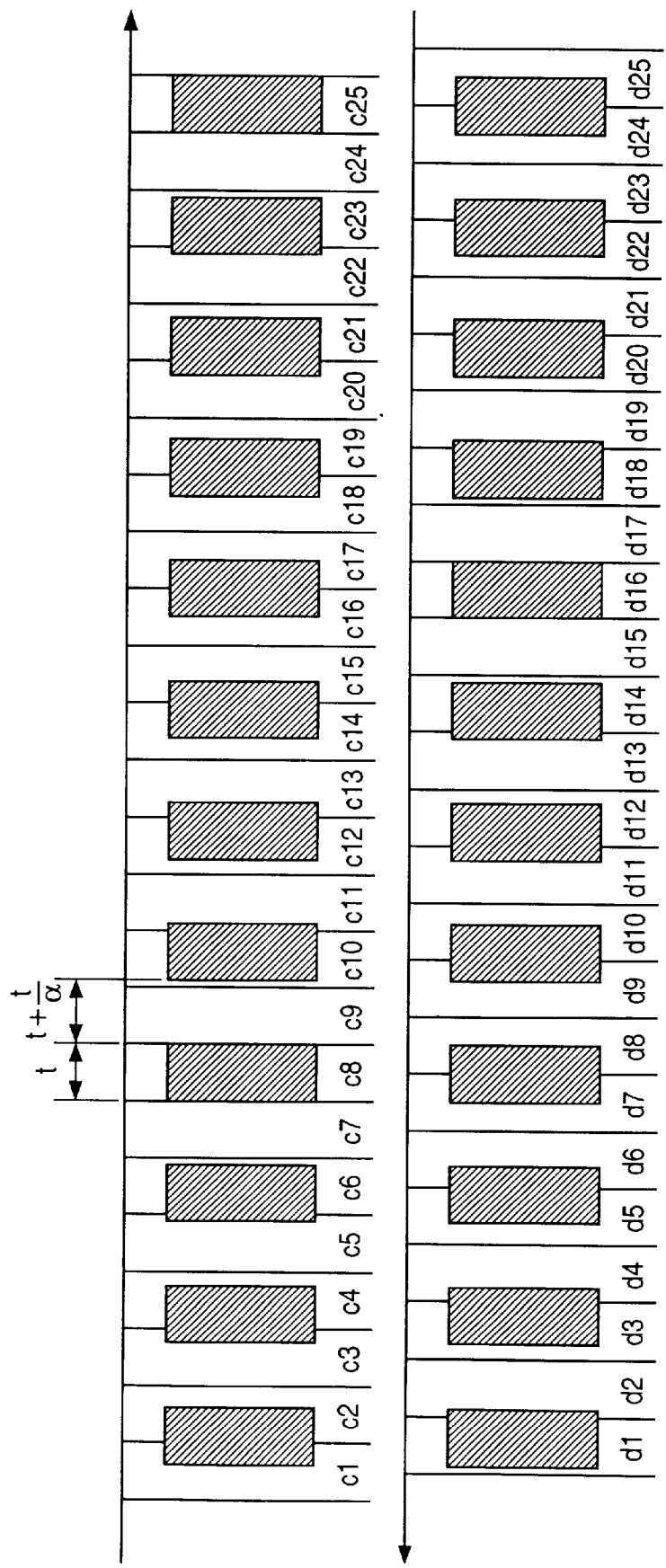
FIG. 19 shows image data obtained when the image pattern shown in FIG. 18 is bi-directionally read.

When such image pattern is bi-directionally read, image data shown in FIG. 19 is obtained. Image data read in forward driving and image data read in backward driving are respectively stored in an image buffer for forward reading and an image buffer for backward reading.

Then, the image buffer for forward reading is searched for a position having the largest amount of image data (black data). In the example shown in FIG. 19, position c8 is detected. Similarly, the image buffer for backward reading is searched for a position having a largest amount of image data, and position d16 is detected. Assuming the carriage driving system has no play, these two positions should match perfectly. Thus, the difference between the position c8 and position d16 in FIG. 19 corresponds to the bi-directional error.

Based on the bi-directional error detected in the foregoing manner, correction time corresponding to the bi-directional error can be calculated. More specifically, correction time X can be calculated by equation (3):

$$X = \{(d16-c8)/2\} \cdot t/\alpha \tag{3}$$

By using the calculated correction time X, read-start timing is adjusted as described above in the reference correction area at the time of backward driving. Accordingly, bi-directional error correction can be performed in unit of the correction resolution $\alpha$.

As has been described above, according to the present invention, reading means is mounted on a carriage and the carriage is reciprocally moved in a predetermined area including the reading material. The reading means bi-directional reads image data of the bi-directional error correction image on the reading material, then image data obtained during forward reading is compared with image data obtained during backward reading to calculate an error correction value, and the bi-directional error is corrected by using the calculated error correction value. Accordingly, highly precise bi-directional reading is realized, and the reading speed can be greatly improved.

Furthermore, image data obtained during forward reading and image data obtained during backward reading are stored, and based on the calculated error correction value, the stored image data is processed to correct the bi-directional error. Therefore, highly precise and high-speed bi-directional reading is possible.

Moreover, density of an arbitrary point of image data obtained during forward reading is detected, and density of image data read at the position near the arbitrary point is detected from the image data obtained during backward reading. Then, based on the density difference between the detected densities, an error correction value is calculated. According to this method, bi-directional error correction can be performed more precisely than when calculating an error correction value based on a deviation of image data.

Furthermore, black data in the image data obtained during forward reading is compared with black data in the image data obtained during backward reading, wherein the foregoing image data is obtained by the reading means which reads the bi-directional error correction image having an image pattern, where black data having the width corresponding to the reading interval of the reading means and white data having a width which is a sum of the reading interval and a predetermined width are arranged alternately. Based on a difference in the detected position of the black data, an error correction value is calculated. According to this method, bi-directional error correction can be performed with higher precision than the bi-direction error correction performed in unit of a predetermined width.

Still further, the present invention provides a program, readable by a computer of a serial scanner apparatus, which comprises the step of bi-directionally reading image data of the bi-directional error correction image by reading means mounted on a carriage by reciprocally moving the carriage in a predetermined area including a reading material which has the bi-directional error correction image, the step of calculating an error correction value by comparing the image data obtained during forward reading of the reading means with image data obtained during the backward reading of the reading means, and the step of correcting a bi-directional error by utilizing the calculated error correction value. Accordingly, the function which enables highly precise bi-directional reading can be installed in a serial scanner apparatus comprising a computer capable of reading such program.

The present invention is not limited to the above embodiments and various changes and modifications can be made within the spirit and scope of the present invention. Therefore, to apprise the public of the scope of the present invention, the following claims are made.

What is claimed is:

1. A serial scanner apparatus comprising:

an image sensor mounted on a carriage, said image sensor bi-directionally reading image data of a bi-directional error correction image by reciprocally moving the carriage in a predetermined area including the image;

a CPU programmed to calculate an error correction value by comparing image data obtained during forward reading of said image sensor with image data obtained during backward reading of said image sensor; and a CPU programmed to correct a bi-directional error by using the calculated error correction value, wherein said CPU programmed to calculate detects density for an arbitrary point of the image data obtained during forward reading and density of image data read at a position near the arbitrary point in the image data obtained during backward reading, and calculates the error correction value based on a difference in the detected densities, wherein the bi-directional error correction image has an image pattern whose density linearly changes in a predetermined area.

2. A serial scanner apparatus comprising:

an image sensor mounted on a carriage, said image sensor bi-directionally reading image data of a bi-directional error correction image by reciprocally moving the carriage in a predetermined area including the image;

a CPU programmed to calculate an error correction value by comparing image data obtained during forward reading of said image sensor with image data obtained during backward reading of said image sensor; and a CPU programmed to correct a bi-directional error by using the calculated error correction value, wherein said CPU programmed to calculate compares black data in the image data obtained during forward reading with black data in the image data obtained during backward reading, said image data obtained by said image sensor which reads the bi-directional error correction image having an image pattern in which black data having a width corresponding to a reading interval of said image sensor and white data having a width which is a sum of the reading interval and a predetermined width are arranged alternately, and based on a difference in detected positions of the black data, said CPU programmed to calculate calculates the error correction value.

3. A bi-directional error correction method of a serial scanner apparatus comprising the steps of:

bi-directionally reading, with an image sensor, image data of a bi-directional error correction image on a reading material by mounting the image sensor on a carriage and reciprocally moving the carriage in a predetermined area including the reading material;

calculating an error correction value by comparing image data obtained during forward reading with image data obtained during backward reading; and correcting a bi-directional error by using the calculated error correction value, wherein density for an arbitrary point of the image data obtained during forward reading and density of image data read at a position near the arbitrary point in the image data obtained during backward reading are detected, and the error correction value is calculated based on a difference in the detected densities, wherein the bi-directional error correction image has an image pattern whose density linearly changes in a predetermined area.

4. A bi-directional error correction method of a serial scanner apparatus comprising the steps of:

bi-directionally reading, with an image sensor, image data of a bi-directional error correction image on a reading material by mounting the image sensor on a carriage and reciprocally moving the carriage in a predetermined area including the reading material;

calculating an error correction value by comparing image data obtained during forward reading with image data obtained during backward reading;

correcting a bi-directional error by using the calculated error correction value;

comparing black data in the image data obtained during forward reading with black data in the image data obtained during backward reading, said image data obtained by the image sensor which reads the bi-directional error correction image having an image pattern in which black data having a width corresponding to a reading interval of the image sensor and white data having a width which is a sum of the reading interval and a predetermined width are arranged alternately; and calculating the error correction value based on a difference in detected positions of the black data.

5. A storage medium storing a program in the form readable by a computer of a serial scanner apparatus, said program comprising the steps of:

bi-directionally reading image data of a bi-directional error correction image by an image sensor mounted on a carriage by reciprocally moving the carriage, having the image sensor, in a predetermined area including a reading material having the bi-directional error correction image;

calculating an error correction value by comparing image data obtained during forward reading of the image sensor with image data obtained during backward reading of the image sensor; and correcting a bi-directional error by using the calculated error correction value, wherein in the step of calculating the error correction value in said program, black data in the image data obtained during forward reading is compared with black data in the image data obtained during backward reading, said image data obtained by the image sensor which reads the bi-directional error correction image having an image pattern in which black data having a width corresponding to a reading interval of the image sensor and white data having a width which is a sum of the reading interval and a predetermined width are arranged alternately, and the error correction value is calculated based on a difference in detected positions of the black data.

6. A serial scanner apparatus comprising:

an image sensor which is mounted on a carriage and reads an image in forward moving and backward moving of the carriage, wherein the carriage moves reciprocally;

a mark arranged at a position where the mark can be read by said image sensor in both of the forward moving and the backward moving;

an image buffer memory which stores a first image which is obtained by reading an image region including said mark by said image sensor in the forward moving, and a second image which is obtained by reading the image region including said mark by said image sensor in the backward moving; and a CPU programmed to calculate an error correction value, the error correction value being used for controlling reading/writing of image data to said image buffer memory so that a position of image data of said mark in the first image in the forward direction coincides with a position of image data of said mark in the second image in the forward direction, wherein, a position error of the image read in the forward moving and the backward moving of said carriage is cancelled by controlling reading/writing of image data read by said image sensor to said image buffer memory on the basis of the error correction value.

7. A control method for a serial scanner apparatus which includes an image sensor which is mounted on a carriage and reads an image in forward moving and backward moving of the carriage, wherein the carriage moves reciprocally, a mark arranged at a position where the mark can be read by said image sensor in both of the forward moving and the backward moving, and an image buffer memory which stores a first image which is obtained by reading an image region including said mark by said image sensor in the forward moving, and a second image which is obtained by reading the image region including said mark by said image sensor in the backward moving, comprising the steps of:

calculating an error correction value which is used for controlling reading/writing of image data to said image buffer memory so that a position of image data of said mark in the first image in the forward direction coincides with a position of image data of said mark in the second image in the forward direction; and canceling a position error of the image read in the forward moving and the backward moving of said carriage by controlling reading/writing of image data read by said image sensor to said image buffer memory on the basis of the error correction value.

8. A storage medium which stores a control program carrying out a control method for a serial scanner apparatus which includes an image sensor which is mounted on a carriage and reads an image in forward moving and backward moving of the carriage, wherein the carriage moves reciprocally, a mark arranged at a position where the mark can be read by said image sensor in both of the forward moving and the backward moving, and an image buffer memory which stores a first image which is obtained by reading an image region including said mark by said image sensor in the forward moving, and a second image which is obtained by reading the image region including said mark by said image sensor in the backward moving, said control method comprising the steps of:

calculating an error correction value which is used for controlling reading/writing of image data to said image buffer memory so that a position of image data of said mark in the first image in the forward direction coincides with a position of image data of said mark in the second image in the forward direction; and canceling a position error of the image read in the forward moving and the backward moving of said carriage by controlling reading/writing of image data read by said image sensor to said image buffer memory on the basis of the error correction value.

* * * * *

UNITED STATES PATENT AND TRADEMARK OFFICE
CERTIFICATE OF CORRECTION

PATENT NO. : 6,650,441 B1
DATED : November 18, 2003
INVENTOR(S) : Hideo Horigome et al.

It is certified that error appears in the above-identified patent and that said Letters Patent is hereby corrected as shown below:

Column 8,
Line 55, please delete "a" and insert therefor -- $\alpha$ --

Signed and Sealed this

Seventh Day of September, 2004

JON W. DUDAS
*Acting Director of the United States Patent and Trademark Office*